(12) United States Patent
Bijjala et al.

(10) Patent No.: US 11,539,550 B2
(45) Date of Patent: Dec. 27, 2022

(54) SYSTEMS AND METHODS FOR DETECTION OF VEHICLE BUS PROTOCOL USING SIGNAL ANALYSIS

(71) Applicant: CalAmp Corp., Irvine, CA (US)

(72) Inventors: Homika Bijjala, Irvine, CA (US); Stephen Hall, Santa Ysabel, CA (US)

(73) Assignee: CalAmp Corp., Irvine, CA (US)

(*) Notice: Subject to any disclaimer, the term of this patent is extended or adjusted under 35 U.S.C. 154(b) by 40 days.

(21) Appl. No.: 16/800,519

(22) Filed: Feb. 25, 2020

(65) Prior Publication Data
US 2021/0266193 A1 Aug. 26, 2021

(51) Int. Cl.
| H04L 12/40 | (2006.01) |
| H04L 43/08 | (2022.01) |
| H04L 69/22 | (2022.01) |

(52) U.S. Cl.
CPC .... *H04L 12/4013* (2013.01); *H04L 12/40013* (2013.01); *H04L 43/08* (2013.01); *H04L 69/22* (2013.01); *H04L 2012/40215* (2013.01); *H04L 2012/40273* (2013.01)

(58) Field of Classification Search
None
See application file for complete search history.

(56) References Cited

U.S. PATENT DOCUMENTS

| 6,581,100 B1* | 6/2003 | Durin | G06F 13/4054 |
| | | | 370/236 |
| 9,734,119 B1* | 8/2017 | Chetverikov | G06F 13/22 |
| 2006/0123176 A1* | 6/2006 | Fredriksson | G06F 13/4291 |
| | | | 710/305 |
| 2009/0323877 A1* | 12/2009 | Tachi | H04L 7/06 |
| | | | 375/362 |
| 2011/0273978 A1* | 11/2011 | Murayama | H04L 12/4015 |
| | | | 370/216 |
| 2012/0143977 A1 | 6/2012 | Miche et al. | |
| 2013/0218412 A1 | 8/2013 | Ricci | |
| 2015/0052226 A1 | 2/2015 | Rude | |
| 2015/0055473 A1* | 2/2015 | Moriya | H04L 12/40006 |
| | | | 370/235 |

(Continued)

FOREIGN PATENT DOCUMENTS

| CN | 106411641 A | 2/2017 |
| WO | 2019128929 A1 | 7/2019 |

OTHER PUBLICATIONS

International Search Report and Written Opinion for International Application No. PCT/US2020/019672, Search completed Apr. 27, 2020, dated May 14, 2020, 13 Pgs.

*Primary Examiner* — The Hy Nguyen
(74) *Attorney, Agent, or Firm* — Barnes & Thornburg LLP

(57) ABSTRACT

Embodiments of the invention include a vehicle telematics device that performs vehicle CAN bus discovery using bit timing analysis. In an embodiment, the vehicle telematics device enters a vehicle CAN bus protocol discovery mode, samples a vehicle CAN bus signal, performs bit timing analysis of the CAN bus signal, calculates a BAUD rate of the vehicle CAN bus based on the bit timing analysis, determines a data packet format of data packets on the vehicle CAN bus, and identifies a vehicle CAN bus protocol from a plurality of vehicle CAN bus protocols based on the calculated BAUD rate and data packet format.

17 Claims, 12 Drawing Sheets

(56) References Cited

U.S. PATENT DOCUMENTS

| | | | |
|---|---|---|---|
| 2015/0092545 A1* | 4/2015 | Katar | H04L 1/0078 |
| | | | 370/230 |
| 2018/0159699 A1* | 6/2018 | Yang | H04L 12/40032 |
| 2019/0058614 A1* | 2/2019 | de Haas | H04L 12/40032 |
| 2020/0015048 A1* | 1/2020 | Mendes | B60L 53/65 |
| 2020/0252066 A1* | 8/2020 | de Haas | H03M 9/00 |
| 2021/0120017 A1* | 4/2021 | Antonsson | G06F 21/604 |

* cited by examiner

| Format | 0 data bytes | | 1 data byte | | 2 data bytes | | 3 data bytes | | 4 data bytes | | 5 data bytes | | 6 data bytes | | 7 data bytes | | 8 data bytes | |
|---|---|---|---|---|---|---|---|---|---|---|---|---|---|---|---|---|---|---|
| | min | max | min | max | min | max | min | max | min | max | min | max | min | max | min | max | min | max |
| 11 bit | 44 | 52 | 52 | 62 | 60 | 72 | 68 | 82 | 76 | 92 | 84 | 102 | 92 | 112 | 100 | 122 | 108 | 132 |
| 29 bit | 64 | 77 | 72 | 87 | 80 | 97 | 88 | 107 | 96 | 117 | 104 | 127 | 112 | 137 | 120 | 147 | 128 | 157 |

| Field name | Length (bits) | Purpose |
|---|---|---|
| Start-of-frame | 1 | Denotes the start of frame transmission |
| Identifier (green) | 11 | A (unique) identifier which also represents the message priority |
| Remote transmission request (RTR) | 1 | Must be dominant (0) for data frames and recessive (1) for remote request frames (see Remote Frame, below) |
| Identifier extension bit (IDE) | 1 | Must be dominant (0) for base frame format with 11-bit identifiers |
| Reserved bit (r0) | 1 | Reserved bit. Must be dominant (0), but accepted as either dominant or recessive. |
| Data length code (DLC) (yellow) | 4 | Number of bytes of data (0–8 bytes) |
| Data field (red) | 0–64 (0–8 bytes) | Data to be transmitted (length in bytes dictated by DLC field) |
| CRC | 15 | Cyclic redundancy check |
| CRC delimiter | 1 | Must be recessive (1) |
| ACK slot | 1 | Transmitter sends recessive (1) and any receiver can assert a dominant (0) |
| ACK delimiter | 1 | Must be recessive (1) |
| End-of-frame (EOF) | 7 | Must be recessive (1) |

820

| Field name | Length (bits) | Purpose |
|---|---|---|
| Start-of-frame | 1 | Denotes the start of frame transmission |
| Identifier A (green) | 11 | First part of the (unique) identifier which also represents the message priority |
| Substitute remote request (SRR) | 1 | Must be recessive (1) |
| Identifier extension bit (IDE) | 1 | Must be recessive (1) for extended frame format with 29-bit identifiers |
| Identifier B (green) | 18 | Second part of the (unique) identifier which also represents the message priority |
| Remote transmission request (RTR) | 1 | Must be dominant (0) for data frames and recessive (1) for remote request frames (see Remote Frame, below) |
| Reserved bits (r1, r0) | 2 | Reserved bits which must be set dominant (0), but accepted as either dominant or recessive |
| Data length code (DLC) (yellow) | 4 | Number of bytes of data (0–8 bytes) |
| Data field (red) | 0–64 (0–8 bytes) | Data to be transmitted (length dictated by DLC field) |
| CRC | 15 | Cyclic redundancy check |
| CRC delimiter | 1 | Must be recessive (1) |
| ACK slot | 1 | Transmitter sends recessive (1) and any receiver can assert a dominant (0) |
| ACK delimiter | 1 | Must be recessive (1) |
| End-of-frame (EOF) | 7 | Must be recessive (1) |

FIG. 8

SYSTEMS AND METHODS FOR DETECTION OF VEHICLE BUS PROTOCOL USING SIGNAL ANALYSIS

FIELD OF THE INVENTION

The present invention relates to systems and methods for detecting a vehicle bus protocol for use in configuration of a telematics device. In particular, to analyzing bus signals on a Controller Area Network (CAN) vehicle bus in order to determine the bus protocol being utilized by a particular vehicle and to configure a telematics device accordingly.

BACKGROUND

Telematics is the integrated use of telecommunications and informatics. Telematics units are installed in vehicles to provide a variety of telematics functionality in the vehicle. This functionality includes, but is not limited to, emergency warning systems, navigation functionality, safety warnings, and automated driving assistance. Telematics units are also capable of recording vehicle information/data related to the operation of the vehicle and providing that information for analysis, whether in real-time or not, such as during a time when the vehicle is being serviced. The vehicle information/data (telematics data) generated by a telematics unit can be used in a variety of applications, such as fleet tracking, shipment tracking, insurance calculations, and in vehicle management and service.

A vehicle bus is a specialized internal communications network that interconnects components inside a vehicle (e.g., automobile, bus, train, industrial or agricultural vehicle, ship, or aircraft). Protocols include Controller Area Network (CAN), Local Interconnect Network (LIN) among various other vehicle bus types. A CAN bus is a robust vehicle bus standard designed to allow microcontrollers and vehicle devices to communicate with each others' applications without a host computer. For each device the data in a frame is transmitted sequentially but in such a way that if more than one device transmits at the same time the highest priority device is able to continue while the others back off. Frames are received by all devices, including by the transmitting device. An OBD2 compliant vehicle can use any of the five communication protocols: SAE J1850 PWM, SAE J1850 VPW, ISO9141-2, ISO14230-4 (KWP2000), and since 2003 also ISO 15765-4/SAE J2480, among various other protocols. ISO15765-4 (CAN-BUS), the most modern protocol and mandatory for all 2008+ vehicles sold in the US provides for four variants of ISO15765 exist. They differ only in identifier length and bus speed: ISO 15765-4 CAN (11 bit ID,500 Kbaud) ISO 15765-4 CAN (29 bit ID,500 Kbaud), ISO 15765-4 CAN (11 bit ID,250 Kbaud), ISO 15765-4 CAN (29 bit ID,250 Kbaud). In order to enable a telematics device to communicate with the vehicle devices on a vehicle, the particular vehicle bus protocol used by the vehicle may need to be identified.

The Society of Automotive Engineers (SAE) has published various standards related to vehicle busses (e.g. SAE J1850) and for communicating with vehicle devices using the vehicle bus via an OBD II diagnostic connector mandated in every new vehicle sold since 1996 (e.g. SAE J1978 and SAE J1979). The SAE J1978 publication teaches a trial and error technique for detecting a vehicle bus protocol, which includes sending working and non-working command signals. In particular, the SAE J1978 publication discloses a bus discovery procedure that can be used by systems interfacing with a vehicle bus via an OBD II diagnostic connector, which includes sending working and non-working command signals in the form of signals referred to as a "mode 1 PID 0 request message" in a manner appropriate for each of the SAE J1850 41.6 Kbps PWM bus, SAE J1850 10.4 Kbps VPW, and ISO 9141-2. Determining the particular vehicle bus protocol used by a vehicle enables a telematics device to communicate with the various vehicle devices available on the vehicle.

Typical electronic vehicle devices on today's vehicles include the Engine Control Unit (ECU), the Transmission Control Unit (TCU), the Anti-lock Braking System (ABS) and body control modules (BCM), among others. Many vehicles sold today have upwards of a hundred vehicle modules. Each module, a node on the vehicle network, controls specific components related to its function and communicates with the other modules as necessary using a particular protocol over the vehicle bus network.

SUMMARY OF THE INVENTION

Systems and methods for detecting a vehicle bus protocol in accordance with embodiments of the invention are disclosed. In an embodiment, a vehicle telematics device in a vehicle, includes: a processor and a memory storing a vehicle telematics application; and a communication interface for communicating with a remote server system and several vehicle modules on a vehicle Controller Area Network (CAN) bus of the vehicle; where the processor of the telematics device, on reading the vehicle telematics application, is directed to: enter a vehicle CAN bus protocol discovery mode; sample a vehicle CAN bus signal; perform bit timing analysis of the CAN bus signal; calculate a BAUD rate of the vehicle CAN bus based on the bit timing analysis; determine a data packet format of data packets on the vehicle CAN bus; and identify a vehicle bus CAN protocol from a plurality of vehicle CAN bus protocols based on the calculated BAUD rate and data packet format.

In an additional embodiment, the processor of the telematics device, on reading the vehicle telematics application, is directed to: monitor for state transitions of the vehicle CAN bus signal; measure pulse widths of the bus CAN signal; and determine bit timing based upon minimum length of valid high and low pulses observed, wherein valid pulses are those pulses matching windows for valid bit pulse times for a BAUD rate of interest.

In yet another embodiment, the processor of the telematics device, on reading the vehicle telematics application, is directed to: measure a data packet length for a plurality of data packets; select a data packet format based on the measured lengths.

In a further embodiment, the processor of the telematics device, on reading the vehicle telematics application, is directed to: measure a data packet length based on a transition edge (1 to 0) of a dominant start-of-frame bit to a transition edge (0 to 1) at beginning of 11+ bit period of recessive (=1) state.

In still a further embodiment, the processor of the telematics device, on reading the vehicle telematics application, is directed to: identify a data pattern in a header of a data packet; and select a data packet format based on the identified pattern.

In still a further embodiment, the processor of the telematics device, on reading the vehicle telematics application, is directed to: identify a timing pattern of a data packet; and select a data packet format based on the identified timing pattern.

In still a further embodiment, a BAUD rate is at least one of the group consisting of 125 kbps, 250 kbps, 500 kbps, and 1 mbps, wherein a data packet format is at least one of the group consisting of an 11-bit standard data packet format and a 29-bit extended data packet format.

In still a further embodiment, the several vehicle bus protocols including an ISO 15765-4 CAN (11 bit ID,500 Kbaud), ISO 15765-4 CAN (29 bit ID, 500 Kbaud), ISO 15765-4 CAN (11 bit ID, 250 Kbaud), and ISO 15765-4 CAN (29 bit ID, 250 Kbaud).

In still a further embodiment, determining a data packet format includes sampling and measuring data packets on the vehicle CAN bus for a threshold time period; and selecting the data packet format based on a statistical analysis of the sampled data packets.

BRIEF DESCRIPTION OF THE DRAWINGS

FIG. 6 illustrates an example of packet timing windows for 11-bit and 29-bit packet formats in accordance with an embodiment of the invention.

FIG. 8 illustrates data fields associated with an 11-bit standard and a 29-bit extended format in accordance with an embodiment of the invention.

DETAILED DESCRIPTION

Turning now to the drawings, systems and methods for detecting a vehicle bus protocol for use in configuration of a telematics device in accordance with embodiments of the invention are disclosed. In particular, many embodiments provide for a telematics device that is able to detect a vehicle CAN bus protocol being used by a particular vehicle in which the telematics device is installed based on an analysis of bus signals sent on the CAN bus, whereby the telematics device can be configured accordingly based on the determination. In many embodiments, the telematics device can do a bit timing analysis and characterization of the bus signals in order to determine a BAUD rate of the CAN bus and a data packet format used. Standard CAN BAUD rates and associated bit times can include 125K, 8 usec; 250 k, 4 usec; 500 k, 2 usec; and 1 M, 1 usec, among others. Protocol formats can include 11-Bit (standard CAN format) and 29-Bit (extended CAN format), among others.

Certain embodiments can also perform various types of CAN data frame analysis and data/timing pattern recognition in order to determine a data frame type being utilized (e.g., 11 bit, standard format, 29 bit extended format, among others) by the particular vehicle bus. In many embodiments, a telematics device can analyze bit patterns within a data frame header in order to detect different frame types. Several embodiments may do a timing analysis of multiple packets and compare to timing windows for different frame types in order to determine a protocol format. In certain embodiments, different types of statistical analysis may be performed on a representative set of frame samples that have been fitted to different formats, and a format type can be determined based on the statistical analysis (e.g., a majority vote of samples fitted to each format).

Based on the information identified during the timing and frame type analysis, a telematics device can identify a protocol for the vehicle bus. In many embodiments, a final BAUD rate and format selection may be based upon a data packet address format and BAUD rate. For example, a CAN 11/250 protocol may use an 11-bit data packet frame format at 250K BAUD rate, and a CAN 29/500 protocol may use a 29-bit data packet format at a 500K BAUD rate. Accordingly, by using a definitive signal based analysis, many embodiments are able to reduce the time needed to ascertain a vehicle bus protocol compared to some existing "trial and error" techniques that have been utilized. Telematics devices that utilize BAUD rate and packet format analysis to detect vehicle CAN bus protocols in accordance with embodiments of the invention are described herein.

Vehicle Telematics Systems

Vehicle telematics systems in accordance with embodiments of the invention can communicate with a telematics device installed on a vehicle. A conceptual diagram of a vehicle telematics system in accordance with an embodiment of the invention is shown in FIG. 1.

Figure 1:
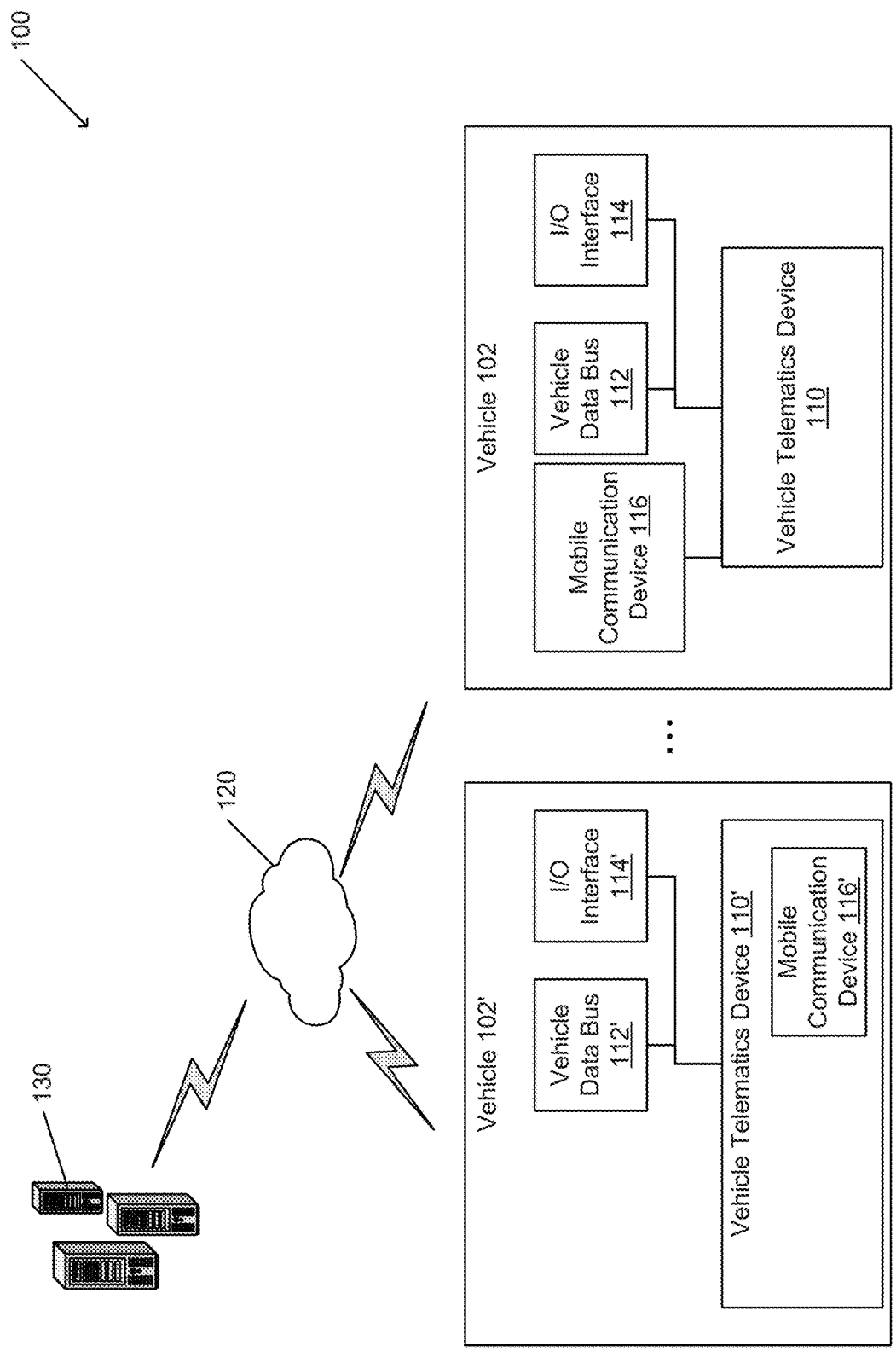
FIG. 1 illustrates a conceptual diagram of a vehicle telematics system in accordance with an embodiment

FIG. 1 is a conceptual diagram of a vehicle telematics system 100 in accordance with an embodiment. Vehicle telematics systems described herein can detect a vehicle bus protocol based on a timing analysis of a raw bus signal from the vehicle CAN bus. The vehicle telematics system 100 includes one or more vehicle telematics devices (110, 110', etc.) typically mounted in or on a vehicle (102, 102', etc.).

A vehicle (102, 102', etc.) can be any car, truck, bus, train, airplane, helicopter, drone, motorcycle, bicycle, watercraft, land craft, and/or aircraft, among other vehicles. A vehicle (102, 102', etc.) can be manned, unmanned, motorized, unmotorized, directly operated, remotely operated, artificial intelligence operated, self-driving, self-flying, and/or self-sailing, among other things. A vehicle can be operated by an operator (e.g., driver) and/or operated at least in part by an automated system (e.g., self-driving system, etc.).

Many other configurations of the vehicle 102 are within the scope of the present technology. FIG. 1 illustrates the vehicle 102' including a vehicle telematics device 110' having a mobile communication device 116'. The vehicle telematics device 110' is coupled to a vehicle data bus 112' and an I/O interface 114'. The devices 110',112',114', and 116' may function like the devices 110, 112, 114, and 116, but may have different physical configurations.

The vehicle telematics device 110 can be coupled to a connector and/or a wire harness in communication with a vehicle data bus 112 of the vehicle 102 to obtain power and exchange signals with one or more vehicle devices or sensors, including one or more electronic control unit (ECU) modules.

The vehicle telematics device 110 can further be coupled to a wired or wireless input/output (I/O) interface 114 and/or a mobile communications device 116 as appropriate to the requirements of specific applications of the embodiments.

In a variety of embodiments, the vehicle telematics device 110 communicates with the remote server system 130 via the mobile communications device 116 over a network 120. In a variety of embodiments, the network 120 is the Internet. In many embodiments, the network 120 is any wired or wireless network, such as a cellular network, between the vehicle telematics device 110 and/or the remote server system 130. In a number of embodiments, the remote server system 130 is implemented by using a single server system. In several embodiments, the remote server system 130 is implemented by using multiple server systems.

In a variety of embodiments, the vehicle telematics device 110 is installed in a vehicle 102 having the vehicle data bus 112. In several embodiments, the vehicle telematics device 110 is connected to a vehicle diagnostic connector that provides access to the vehicle data bus 112. In many embodiments, the vehicle data bus 112 is a CAN vehicle bus. The vehicle telematics device 110 can obtain data from any of a variety of vehicle devices and modules connected to the vehicle data bus 112 utilizing any of a variety of techniques as appropriate to the requirements of specific applications of embodiments. Vehicle devices can include, but are not limited to, engine sensors, electronic control unit (ECU) devices, alternator sensors, vibration sensors, voltage sensors, oxygen sensors, Global Positioning System (GPS) receivers, ignition devices, weight sensors, wireless network devices, and/or acceleration determination devices. In a number of embodiments, the vehicle telematics device is connected directly, either wired or wirelessly, to one or more sensors within the vehicle 102 and/or does not utilize the vehicle data bus 112.

The vehicle telematics device 110 can include any of a variety of sensors and/or devices, including those described herein with respect to the vehicle data bus and any described in more detail herein, to obtain data regarding the vehicle and its environment. The vehicle telematics device 110 can also communicate with any of a variety of sensors and/or devices by using the I/O interface 114. The I/O interface 114 can be any connection, including wired and wireless connections, as appropriate to the requirements of specific applications of the embodiments.

In several embodiments, the vehicle telematics device 110 is capable of executing scripts to read data and/or perform particular processes. These scripts can be pre-loaded on the device and/or obtained from the remote server system 130, vehicle data bus 112, and/or the I/O interface 114 as appropriate to the requirements of specific applications of the embodiments. The vehicle telematics device 110 can be self-powered and/or connected into the electrical system of the vehicle 102 in which the vehicle telematics device 110 is installed. In a variety of embodiments, the vehicle telematics device is powered via the vehicle data bus 112 and/or the I/O interface 114.

In many embodiments, one of the sensor devices of the vehicle telematics device 110 is a Global Positioning System (GPS) receiver in order to determine the location, speed, and/or acceleration of the vehicle 102. In many embodiments, one of the sensor devices of the vehicle telematics device 110 is a multidimensional accelerometer to acquire acceleration and/or speed of the vehicle 102.

In a variety of embodiments, the vehicle telematics device 110 and/or remote server system 130 provides a user interface allowing for visualizing and interacting with the data transmitted and/or received between the systems. In several embodiments, the vehicle telematics device 110 and/or remote server system 130 provides an interface, such as an application programming interface (API) or web service that provides some or all of the data to third-party systems for further processing. Access to the interface can be open and/or secured by using any of a variety of techniques, such as by using client authorization keys, as appropriate to the requirements of specific applications.

Although a specific architecture of a vehicle telematics system in accordance with embodiments are discussed herein and illustrated in FIG. #1, a variety of architectures, including vehicles with different vehicle bus protocols (e.g., CAN, I$^2$C, ISO 9141-1/-2, J1708 and J1587, J1850, J1939, among various other vehicle bus protocols) and other devices and techniques not specifically described herein, can be utilized in accordance with embodiments. Furthermore, the processes described herein can be performed by using any combination the vehicle telematics device, mobile communications device, and/or the remote server systems as appropriate to the requirements of specific applications of the embodiments.

Vehicle Telematics Devices and Remote Server Systems

Figure 2A:
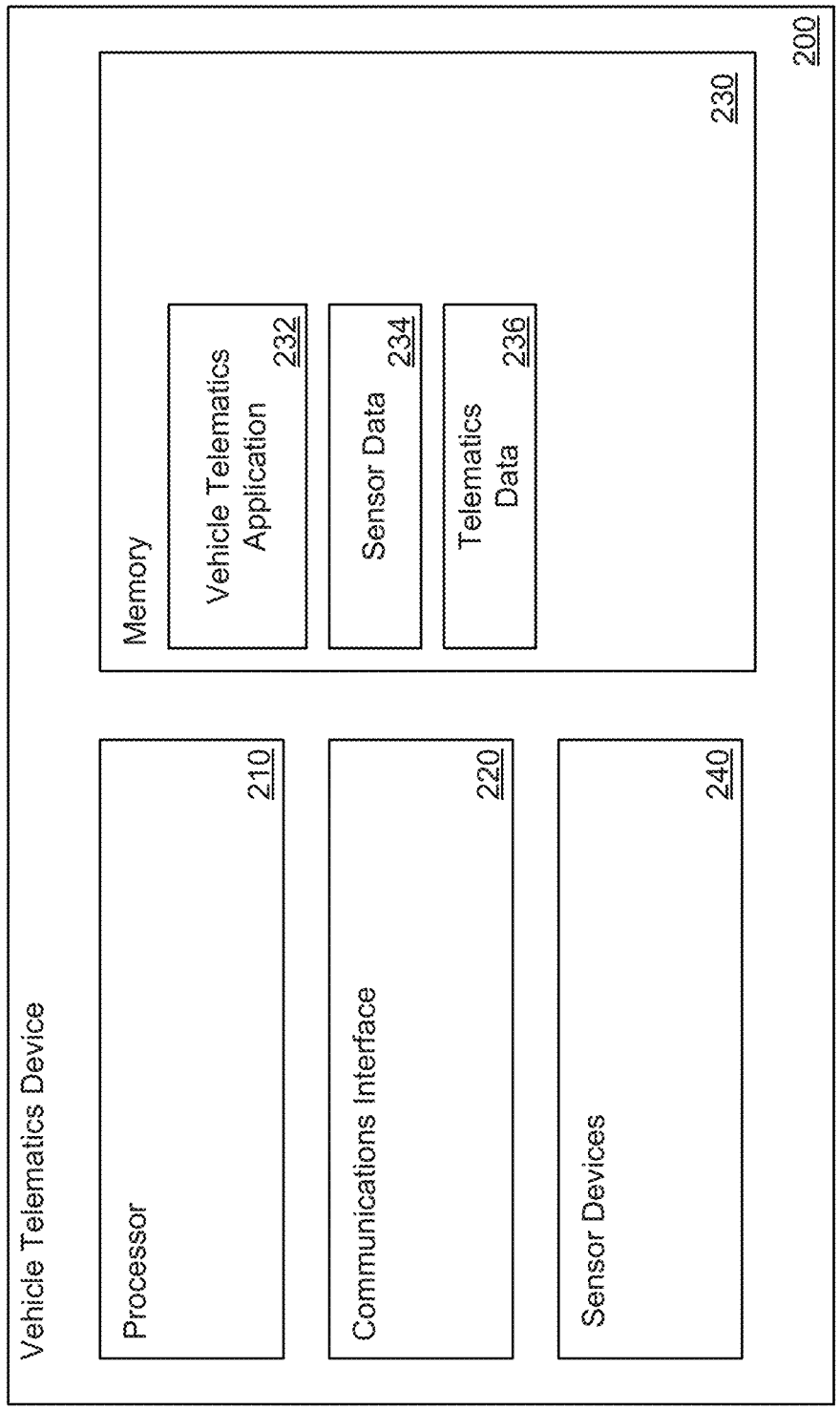
FIG. 2A is a conceptual block diagram of a vehicle telematics device in accordance with an embodiment of the invention.

FIG. 2A is a conceptual block diagram of a vehicle telematics device in accordance with an embodiment of the invention. Vehicle telematics devices and remote server systems in accordance with the embodiments can transmit and receive data regarding the vehicle. The vehicle telematics device 200 includes a processor 210 in communication with memory 230. The vehicle telematics device 200 can also include one or more communication interfaces 220 capable of sending and receiving data. In a number of embodiments, the communication interface 220 is in communication with the processor 210, the memory 230, and/or the sensor device(s) 240. In several embodiments, the memory 230 is any form of storage configured to store a variety of data, including, but not limited to, a vehicle telematics application 232, sensor data 234, telematics data 236, and one more machine learning models 238. In many embodiments, the vehicle telematics application 232, sensor data 234, telematics data 236, and/or machine learning models 238 are stored by using an external server system and received by the vehicle telematics device 200 by using the communications interface 220.

Sensor devices 240 can include RPM sensors, voltage sensors, GPS receivers, noise sensors, vibration sensors, acceleration sensors, weight sensors, and any other device capable of measuring data regarding a vehicle as appropriate to the requirements of specific applications of the embodiments. Sensor devices 240 can be included within the vehicle telematics device 200 and/or located external to the vehicle telematics device 200. The vehicle telematics device 200 can communicate with external sensor devices by using the communications interface 220, such as via a vehicle data bus, I/O interface (including serial interfaces), mobile communications device, and/or a network connection as appropriate to the requirements of specific applications of embodiments. In a variety of embodiments, a vehicle telematics device is connected to a diagnostic connector (e.g. an OBD II port) in a vehicle. In some embodiments, signal data monitored from the vehicle CAN bus can be utilized in order to identify the vehicle CAN bus protocol of the vehicle. For example, a BAUD rate and data frame format can determined and used to identify the CAN bus protocol. It should be readily appreciated by one having ordinary skill that these are merely illustrative examples and any such information can be used as appropriate to the requirements of specific applications.

Figure 2B:
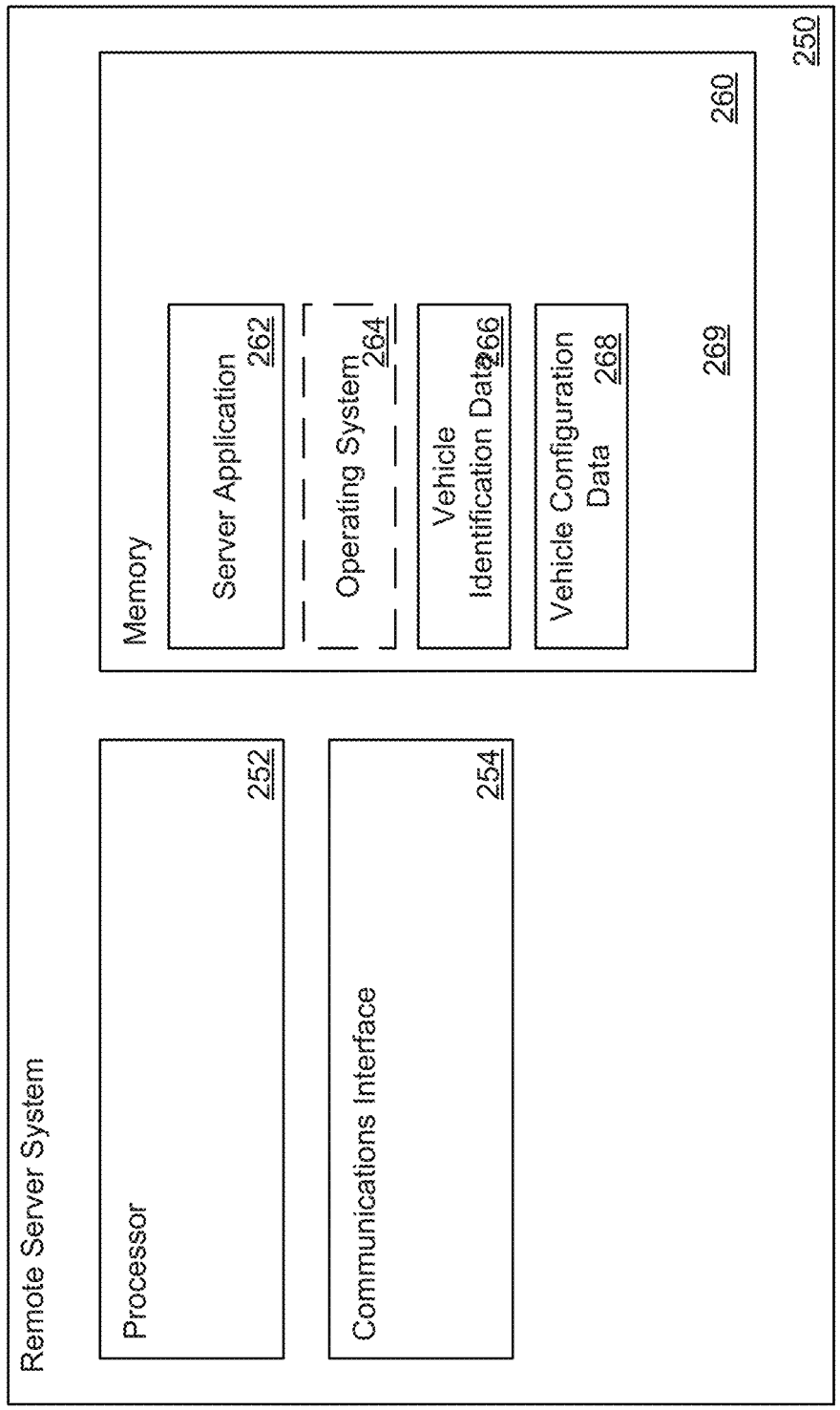
FIG. 2B is a conceptual block diagram of a remote server system, in accordance with an embodiment of the invention.

FIG. 2B is a conceptual block diagram of a remote server system, in accordance with an embodiment. The remote server system 130 includes a processor 252 in communication with memory 260. The remote server system 130 can also include one or more communications interfaces 254 capable of sending and receiving, such as with a vehicle telematics device. In a number of embodiments, the communication interface is in communication with the processor 252 and/or the memory 260. In several embodiments, the memory 260 is any form of storage configured to store a variety of data, including, but not limited to, a server application 262, an operating system 264, vehicle identification data 266, vehicle configuration data 268. In many embodiments, the server application 262, an operating system 264, vehicle identification data 266, and vehicle configuration data 268 are stored by using an external server system and received by the remote server system 130 by using the remote communications interface 254.

The processor 210 and processor 252 can be directed, by the vehicle telematics application 232 and the server application 262 respectively, to perform a variety of vehicle CAN bus protocol identification processes. Vehicle CAN bus protocol identification processes can include monitoring vehicle bus data and identifying a vehicle CAN bus protocol for the particular vehicle platform. In many embodiments, the vehicle CAN bus protocol can be determined by doing a bit timing analysis to determine a BAUD rate of the vehicle bus, and performing a data packet frame analysis in order to determine a data frame type being used on the bus. Vehicle CAN bus protocol detection processes that can be performed in accordance with embodiments are described in more detail herein. Although specific architectures for vehicle telematics devices and remote server systems for vehicle bus protocol discovery in accordance with embodiments are conceptually illustrated in FIGS. 2A-B, any of a variety of architectures, including those that store data or applications on disk or some other form of storage and are loaded into memory at runtime, can also be utilized. Additionally, any of the data utilized in the system can be cached and transmitted once a network connection (such as a wireless network connection via the communications interface) becomes available. In a variety of embodiments, a memory includes circuitry such as, but not limited to, memory cells constructed by using transistors, that are configured to store instructions. Similarly, a processor can include logic gates formed from transistors (or any other device) that dynamically perform actions based on the instructions stored in the memory. In several embodiments, the instructions are embodied in a configuration of logic gates within the processor to implement and/or perform actions described by the instructions. In this way, the systems and methods described herein can be performed utilizing both general-purpose computing hardware and by single-purpose devices.

Integrated Asset Tracker

Figure 3:
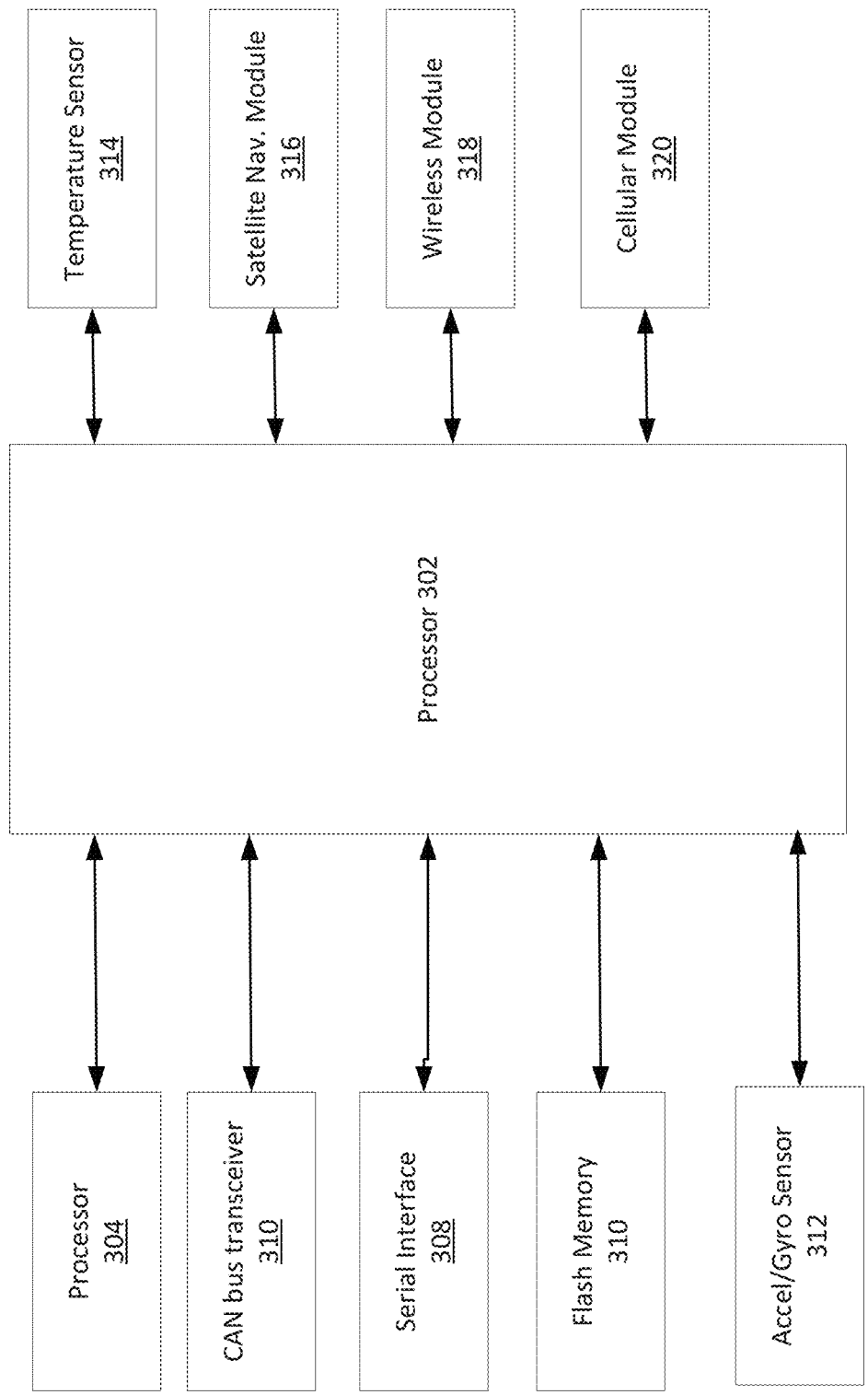
FIG. 3 illustrates a block circuit diagram of components of a telematics device in accordance with an embodiment of the invention.

FIG. 3 illustrates a block circuit diagram of components of a telematics device in accordance with an embodiment of the invention. The block circuit diagram illustrates components that cooperate to provide one or more capabilities of the telematics device, including a processor 302 (e.g., an STM32L496VG or STM32L4A6VG from STMICROELECTRONICS) a communication bus module 3304 (e.g., a 1-Wire communication bus module, such as a DS2484R+T from MAXIM INTEGRATED) connected to the processor over an I2C bus, a CAN bus transceiver 506 (e.g., a CAN H/L MCP2562T-E/MF from MICROCHIP TECHNOLOGY INC.), a serial interface 308 (e.g., a MAX3218EAP RS-232 interface from MAXIM INTEGRATED) with Universal Asynchronous Receiver-Transmitter (UART) support, flash memory 310 (e.g., a W25Q16FWUXIE flash memory module from WINBOND ELECTRONICS) connected via a Serial Peripheral Interface (SPI), an accelerometer and gyroscopic sensor 312 (e.g., an LSM6DSL chip from STMICROELECTRONICS) connected via SPI, a temperature sensor 314 (e.g., a STTS751 temperature sensor by STMICROELECTRONICS) connected via SPI, a satellite navigation module 316 (e.g., a UBX-M8030 from U-BLOX HOLDING AG) connected via UART, a wireless module 318 (e.g., a BLUETOOTH wireless module, such as a BLUENRG-2 module from STMICROELECTRONICS) connected over UART, a cellular module 320 (e.g., a BG96 module or EG91 module from QUECTEL WIRELESS SOLUTIONS CO.) connected via UART. Although FIG. 3 illustrates a particular circuit diagram of various components of a telematics device, any of a variety of components may be specified as appropriate to the requirements of specific applications in accordance with embodiments of the invention.

Software Architecture

Figure 4:
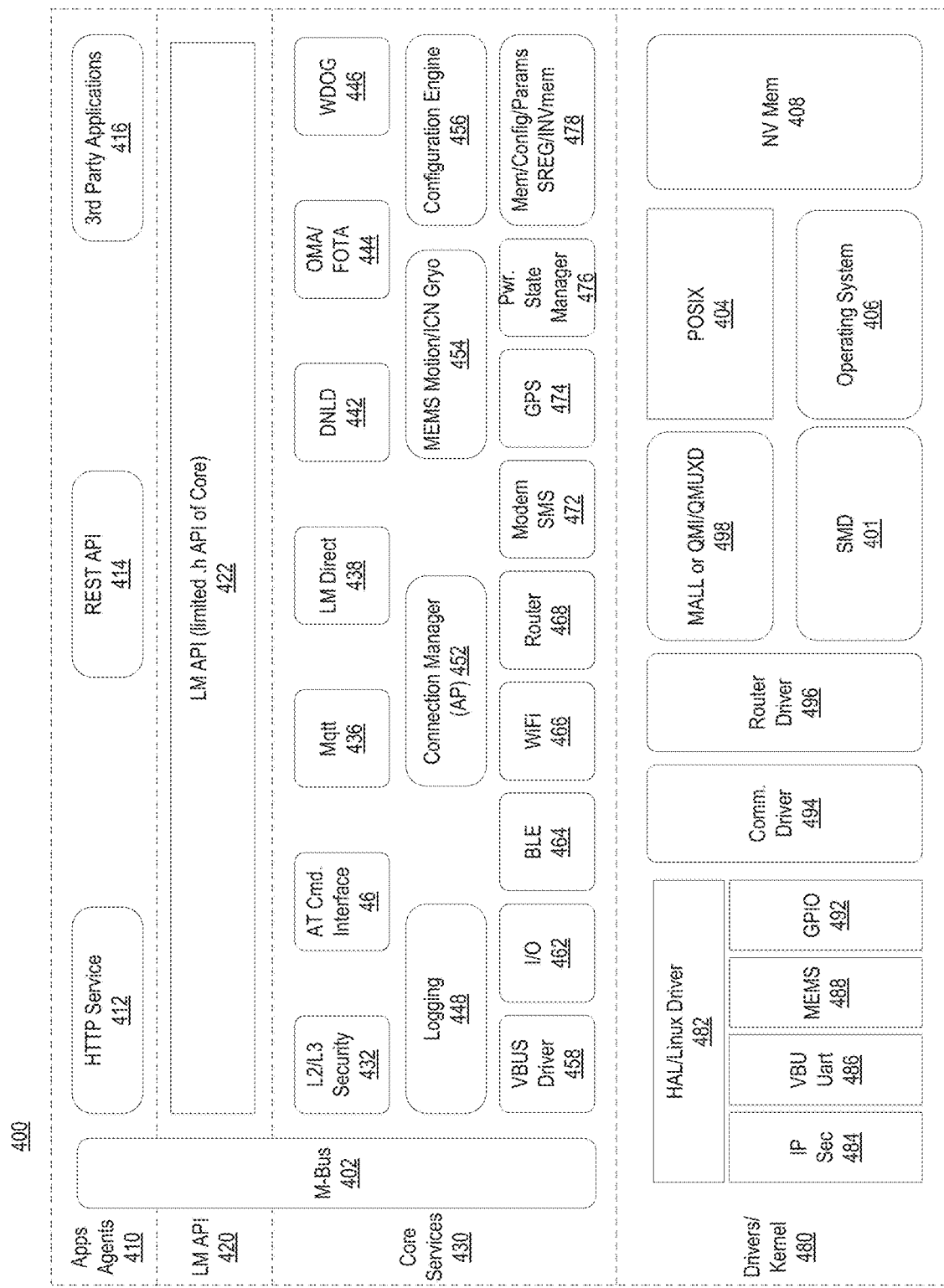
FIG. 4 illustrates a software architecture for use with telematics devices in accordance with an embodiment of the invention.

FIG. 4 illustrates a software architecture 400 for use with telematics devices described herein in accordance with an embodiment of the invention. The software architecture 400 is an example software architecture for providing one or more of the features and capabilities of the telematics device. The software architecture 400 includes a message bus 402, an application/agent layer 410, an LM API layer 420, a core services layer 430, and a driver/kernel layer 480. The application/agent layer 410 includes an HTTP service 412, a REST API 414, and 3rd party applications 416. The LM API layer 420 includes an LM API 422 (e.g., a limited header API of the core services). The core services layer 430 includes an L2/L3 security service 432, an AT command interface service 434, an MQTT (Message Queuing Telemetry Transport) service 436, an LM direct service 438, a DNLD service 442, an OMA/FOTA service 444, a WDOG service 446, a logging service 448, a connection manager service 452, a MEMS motion/ICN Gyro service 454, a configuration engine 456, a VBUS driver 458, an I/O service 462, a BLUETOOTH LE service 464, a WIFI service 466, a router service 468, a modem SMS service 472, a GPS service 474, a power state manager service 476, and a memory/configuration/parameter SREG INVmem service 478. The drivers/kernel layer 480 includes a HAL (Hardware Abstraction Layer)/Linux driver, an IP sec module 484, a VBU UART module 486, a MEMS module 488, a GPIO module 492, communication drivers 494 (e.g., drivers for HOSTAP, WIFI, or BLUETOOTH LE), a router driver 496 (e.g., IPTABLES), MALL/QMI/QMUXD drivers 498, SMD drivers 401, a POSIX interface 404, an operating system 406 (e.g., a LINUX operating system or a real time operating system such as THREADX), and an NV memory module 408. A telematics device can use the configuration engine 456 and one or more scripts to perform one or more vehicle CAN bus protocol identification and telematics device configuration processes. Although FIG. 4 illustrates a particular software architecture of a telematics device with automatic vehicle CAN bus protocol identification and configuration features, any of a variety of software architectures for the telematics device may be utilized as appropriate to the requirements of specific applications in accordance with embodiments of the invention.

Bit Timing and Baud Rate Analysis

Many embodiments of the telematics device perform a bit timing analysis in order to determine a BAUD rate of the vehicle CAN bus. All nodes on the CAN network may operate at the same nominal bit rate, but noise, phase shifts, oscillator tolerance and oscillator drift mean that the actual bit rate may not be the same as the nominal bit rate. Since a separate clock signal may not be used, a means of synchronizing the nodes may be needed. Synchronization can be important during arbitration since the nodes in arbitration should be able to see both their transmitted data and the other nodes' transmitted data at the same time. Synchronization can also be important to ensure that variations in oscillator timing between nodes do not cause errors.

Figure 5:
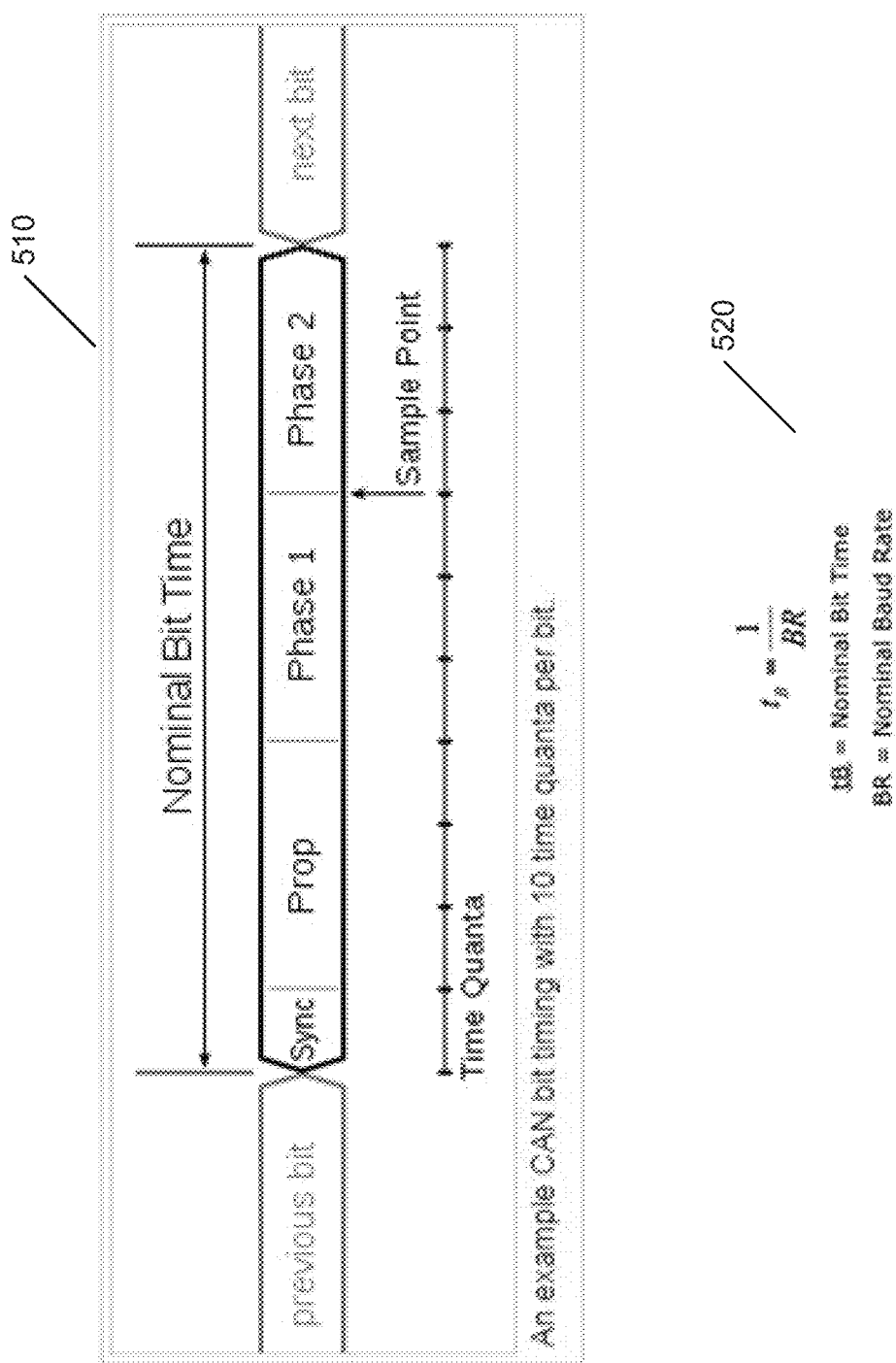
FIG. 5 illustrates an example of CAN bit timing in accordance with an embodiment of the invention.

Synchronization can start with a hard synchronization on the first recessive to dominant transition after a period of bus idle (the start bit). Resynchronization may occur on every recessive to dominant transition during the frame. The CAN controller expects the transition to occur at a multiple of the nominal bit time. If the transition does not occur at the exact time the controller expects it, the controller adjusts the nominal bit time accordingly. FIG. 5 illustrates an example of CAN bit timing in accordance with an embodiment of the invention. The adjustment can be accomplished by dividing each bit into a number of time slices called quanta 510, and assigning some number of quanta to each of the four segments within the bit: synchronization, propagation, phase segment 1 and phase segment 2, as illustrated in FIG. 5. The number of quanta the bit is divided into can vary by controller, and the number of quanta assigned to each segment can be varied depending on bit rate and network conditions.

A transition that occurs before or after it is expected may cause the controller to calculate the time difference and lengthen phase segment 1 or shorten phase segment 2 by this time. This effectively adjusts the timing of the receiver to the transmitter to synchronize them. This resynchronization process can be done continuously at every recessive to dominant transition to ensure the transmitter and receiver stay in sync. Continuously resynchronizing may reduce errors induced by noise, and allows a receiving node that was synchronized to a node which lost arbitration to resynchronize to the node which won arbitration.

In many embodiments, during the vehicle bus protocol discovery to determine a BAUD rate, a telematics device may monitor a bus signal for state transitions (e.g., H-L, L-H). In many embodiments, if no state transitions are detected after an extended period while the vehicle engine is operational, many embodiments may select a default protocol for the vehicle bus. In certain embodiments, the default protocol can be the 11-bit/500K protocol.

Once a transition is detected, many embodiments may perform a bit timing analysis of the observed data patterns from the vehicle CAN bus to determine the BAUD rate of the CAN bus. In particular, certain embodiments may determine bit timing based upon a minimum length of valid high and/or low pulses observed, where the data may use non-return to zero (NRZ) coding. In many embodiments, valid pulses can be those pulses matching windows for valid bit pulse times for the BUAD rates of interest. In many embodiments, results can be statistically analyzed using a sample time of a particular threshold (e.g., 2 seconds).

In many embodiments, once a bit timing is determined, a BAUD rate can be calculated based on the bit time using equation 520 illustrated in FIG. 5. Although FIG. 5 illustrates a particular technique for determining a BAUD rate using bit timing analysis, any of a variety of techniques can be utilized as appropriate to the requirements of specific applications. Analysis of data packets to determine vehicle BUS protocol address formats in accordance with embodiments of the invention are described herein.

Data Frame Format Detection Based on Packet Length

Figure 7:
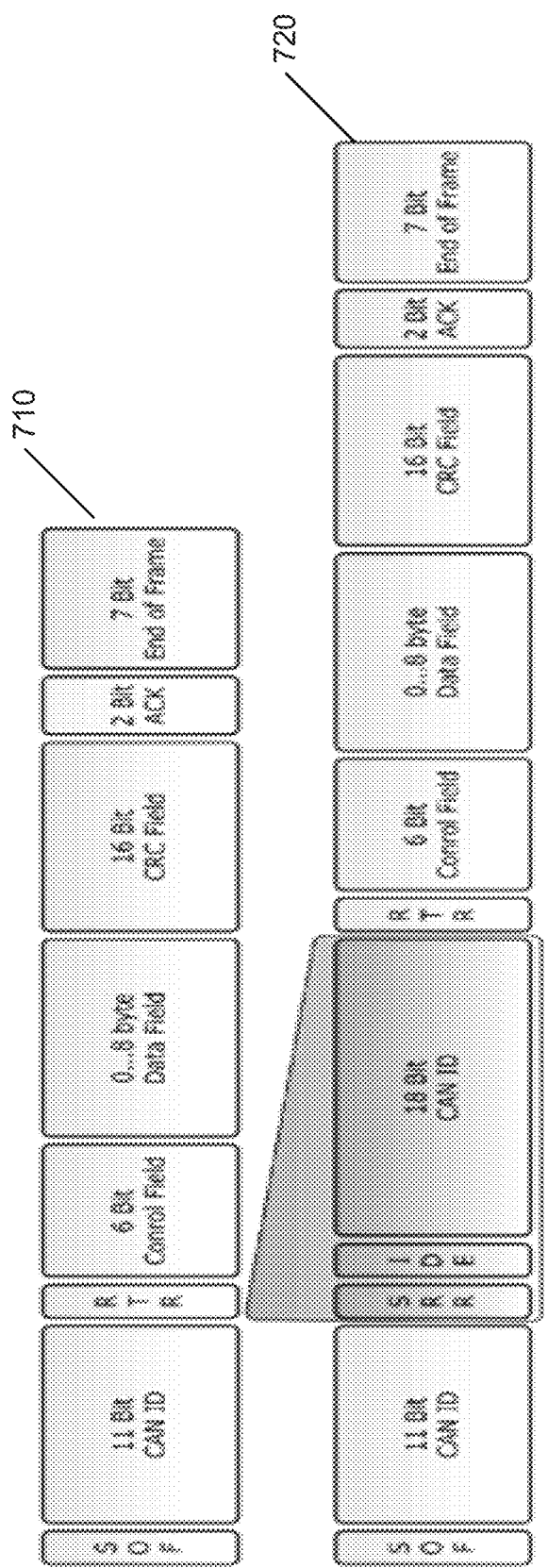
FIG. 7 illustrates a header pattern that includes a particular pattern of data fields associated with an 11-bit standard and a 29-bit extended format in accordance with an embodiment of the invention.

Many embodiments may perform an analysis of data packets in order to determine the vehicle CAN bus protocol address format (e.g., 11 bit standard format, 29-bit extended format, among others). An example of a standard 11-bit base frame format and 29-bit extended frame format in accordance with an embodiment of the invention is illustrated in FIG. 7. The standard frame format 710 includes, among various other fields, a start-of-frame field name that is 1 bit in length and that denotes the start of frame transmission and an 11-bit CAN ID. An extended frame format 710 can include, among various other data fields, a start-of-frame, an 11-bit CAN ID, and also an 18 bit CAN ID.

Many embodiments may determine a packet length to identify a packet format. In many embodiments, an overall length of the frame can be determined by using a transition edge (1 to 0) of the dominant start-of-frame bit to transition edge (0 to 1) at the beginning of 11+ bit period of recessive (=1) state. In many embodiments, the end-of-field bit may not be counted as part of the frame length, it may be considered part of the 11-bit minimum inter-frame period. In many embodiments, frames can be sampled and measured for a particular time period (e.g., approximately 3 seconds).

In many embodiments, due to bit stuffing used with the NRZ coding used in the CAN protocol, packet lengths can vary even for packets with a fixed length data payload. The variable number of data bytes in the payload (e.g., 0 to 8) can also contribute to the variability in the overall packet length. Accordingly, to provide increased accuracy for protocol address format detection, many embodiments can also perform one or more timing based analysis and/or data/timing pattern analysis of packet headers in order to determine the packet format used.

Data Frame Format Detection Based on Timing of Multiple Packets

In many embodiments, packet protocol formats can be identified using a timing based analysis. In particular, several embodiments may examine the timing of multiple packets in relation to timing windows for 11-bit or 29-bit address formats. Packet timing windows for 11-bit and 29-bit packet formats in accordance with an embodiment of the invention are illustrated in FIG. 6. As illustrated, the 11-bit standard format can have a typical bit times between 44-132 usec as bit times. A 29-bit extended CAN format can have bit times between 64-157 usec as bit times. For example, an 11-bit standard packet with 0 data bytes should have a bit time between 44-52 usec. A 29-bit extended packet format with 0 data bytes should have a bit time between 64-77 usec. Accordingly, in many embodiments, timing of multiple data packets can be examined and fitted to the timing window illustrated in FIG. 6 for 11-bit and 29-bit formats. Based on a representative set of sample, an actual address format can be determined based on a statistical analysis of the representative sample set. In some embodiments, a majority vote of the samples fitted to each format can be used to identify the address format. Although FIG. 6 illustrates using a timing table with a particular set of times to determine a packet format, any of a variety of timing windows with different times associated with different packet types may be utilized as appropriate to the requirements of specific applications in accordance with embodiments of the invention.

Data Frame Format Detection Based on Data/Timing Patterns in Packet Header Section In many embodiments, an examination of specific data and/or timing patterns in a header section of a data packet can be used to determine the packet format (e.g., 11-bit standard format, 29-bit extended format, among others). In particular, as illustrated in FIG. 7 and FIG. 8, many embodiments can detect an 11-bit standard format by identifying a header pattern that includes the particular pattern of data fields associated with the 11-bit standard format 810, and can detect a 29-bit extended format by identifying a header pattern that includes the particular data field pattern associated with the 29-bit extended format 820. Accordingly, based on the different patterns associated with the different headers, many embodiments are able to determine a packet format based on this analysis of the data patterns.

In many embodiments, an 11-bit standard and a 29-bt extended format can be identified by examining an overall packet at a known BAUD rate and determining the overall length of the packet. In many embodiments, the end-of-frame may not be counted as part of a frame length, as it may be considered part of the 11-bit minimum inter-frame period. As illustrated in FIG. 8, an 11-bit standard format can include 1 bit start-of-frame (SOF), 11 bits identifier, 1 bit remote transmission request (RTR), 1 bit identifier extension bit (IDE), 1 bit reserved, 4 bits data length code (DLC), 0-64 bits data field, 15 bits CRC, 1 bit CRC delimiter, 1 bit ACK slot, 1 bit ACK delimiter, and 7 bits end-of-frame. A 29-bit extended format can include 1 bit SOF, 11 bit identifier, 1 bit substitute remote request, 1 bit IDE, 18 bit identifier, 1 bit RTR, 2 bits reserved, 4 bits data length code, 0-64 bits data field, 15 bits CRC, 1 bit CRC delimiter, 1 bit ACK slot, 1 bit ACK delimiter, and 7 bits EOF. Accordingly, an 11-bit format packet can have a packet length, excluding the EOF and data field, of 37 bits.

A 29-bit extended format packet can be identified by a packet length, excluding the EOF and data fields, of 57 bits. In many embodiments, patters in the packet headers can be analyzed to identify an 11-bit format packet and a 29-bit extended format packet. In many embodiments, the packets can be identified based on whether a bit is a dominant or recessive bit. Although FIG. 7 and FIG. 8 illustrate identifying a packet format using particular timing and data patterns in a header of a packet, any of a variety of timing and data patterns may be utilized to identify 11-bt and 29-bit packet formats as appropriate to the requirements of specific applications in accordance with embodiments of the invention. Processes for detecting vehicle bus protocols in accordance with embodiments of the invention are described herein.

Vehicle Bus Protocol Detection Using Bit Timing and Baud Rate

Figure 9:
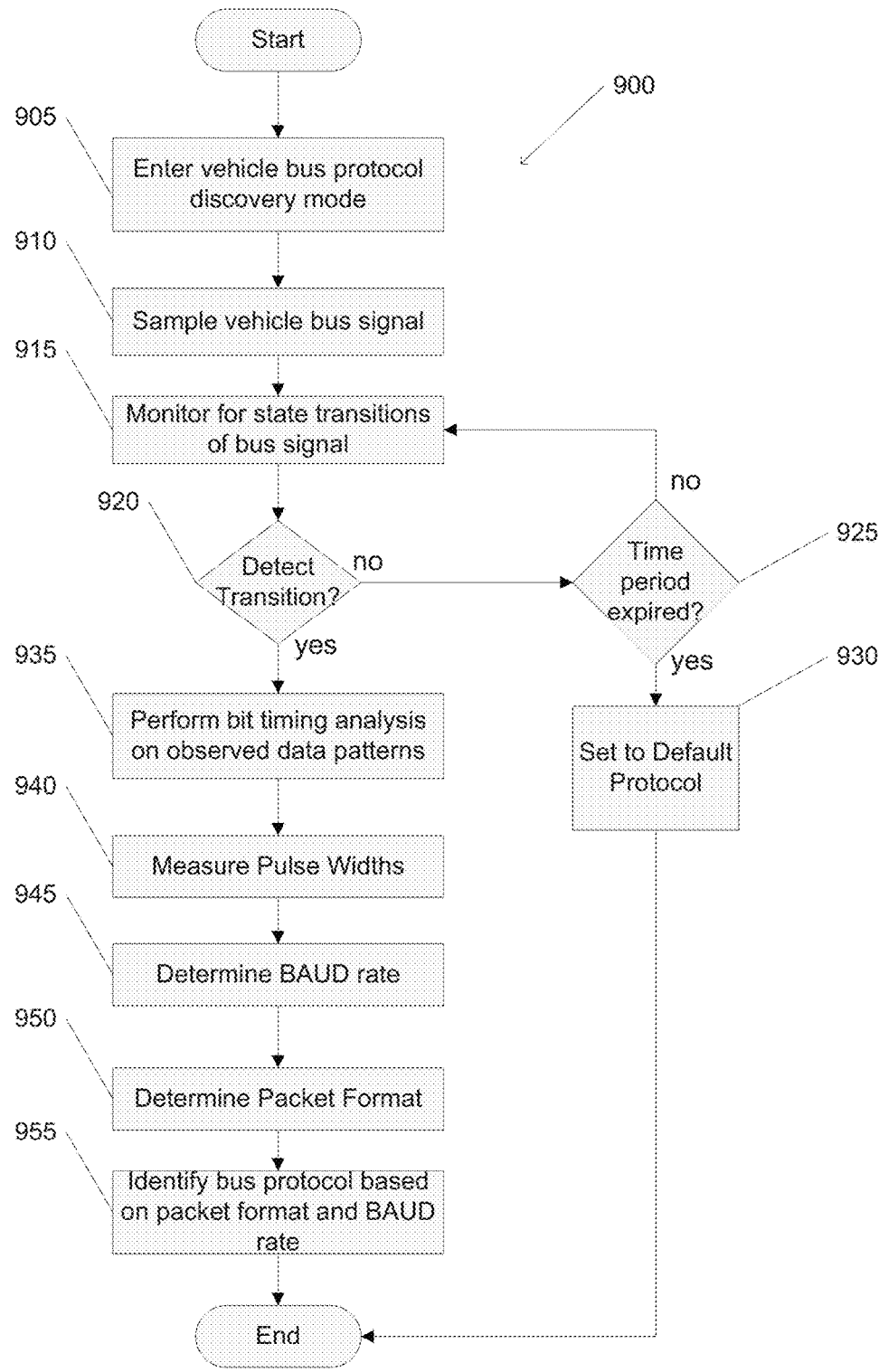
FIG. 9 illustrates a process for identifying a vehicle CAN bus protocol based on an analysis of a CAN bus signal in accordance with an embodiment of the invention.

Many embodiments are able to identify a vehicle CAN bus protocol based on an analysis of the CAN bus signal. A process for identifying a vehicle CAN bus protocol based on an analysis of a CAN bus signal in accordance with an embodiment of the invention is illustrated in FIG. 9. The process enters 905 a vehicle bus protocol discovery mode. The process samples (910) a vehicle bus signal. The process monitors (915) for state transitions of the bus signal. The process determines (920) whether it detects a transition. If the process does not detect a transition, the process determines (925) if a time period has expired. If the time period has not expired, the process returns to monitor (915) for state transition of the bus signal. If the time period has expired, the process sets (930) to a default protocol and end. If the process detects a state transition, the process performs (935) bit timing analysis on observed data patterns. The process measures 940 a pulse width. The process determines (945) a BAUD rate of the CAN bus. In many embodiments, the BAUD rate can be determined based on the determined bit times. The process determines (950) a packet format (e.g., 11-bit standard, 29-bit extended, among others). In many embodiments, the process determines a packet format type based on an analysis of timing and/or data patterns of headers of multiple data packets. The process identifies (955) a CAN bus protocol based on the determined BAUD rate and packet format. The process ends.

Specific processes for identifying a vehicle CAN bus protocol based on a CAN bus signal analysis in accordance with embodiments of the invention are described above and shown with respect to FIG. 9; however, any number of processes can be utilized as appropriate to the requirements of a specific application in accordance with embodiments of the invention.

Figure 10:
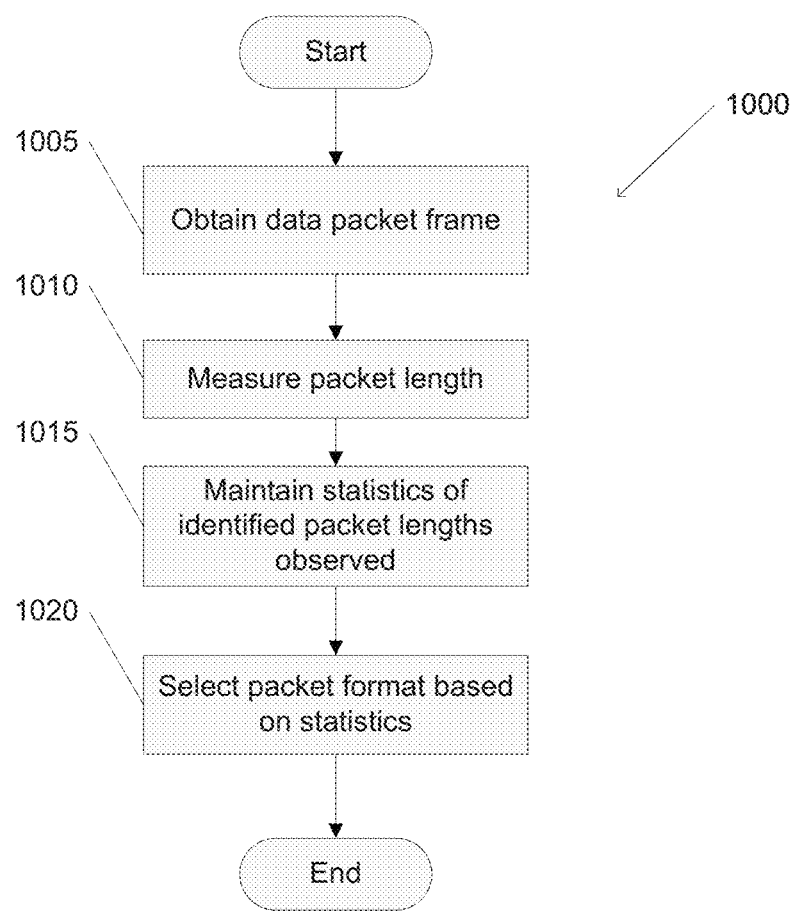
FIG. 10 illustrates a process for identifying a packet format of data transmitted on a vehicle bus based on a packet frame length in accordance with an embodiment of the invention.

Many embodiments identify a vehicle CAN bus protocol based on an analysis of the CAN bus signal to determine a packet format (e.g., 11-bit standard format, 29-bit extended format, among others) based on a packet length of the frame of data being transmitted on the vehicle bus. A process for identifying a packet format of data transmitted on a vehicle bus based on a packet frame length in accordance with an embodiment of the invention is illustrated in FIG. 10. The process 1000 obtains (1005) a data packet format. The process measures (1010) a packet length. In many embodiments, a packet length can be computed based on a transition edge (1 to 0) of dominant SOF bit to transition edge (0 to 1) at beginning of 11+ bit period of recessive (=1) state, where the EOF is not counted as part of the frame length. In many embodiments, frames can be sample and measured for a certain time period (e.g., 3 seconds).

The process maintains (1015) statistics of identified packet lengths. The process selects (1020) a packet format (e.g., 11-bit standard format, 29-bit extended format, among others) based on the statistics. The process ends. Specific processes for identifying a vehicle CAN bus packet format based on packet length in accordance with embodiments of the invention are described above and shown with respect to FIG. 10; however, any number of processes can be utilized as appropriate to the requirements of a specific application in accordance with embodiments of the invention.

Figure 11:
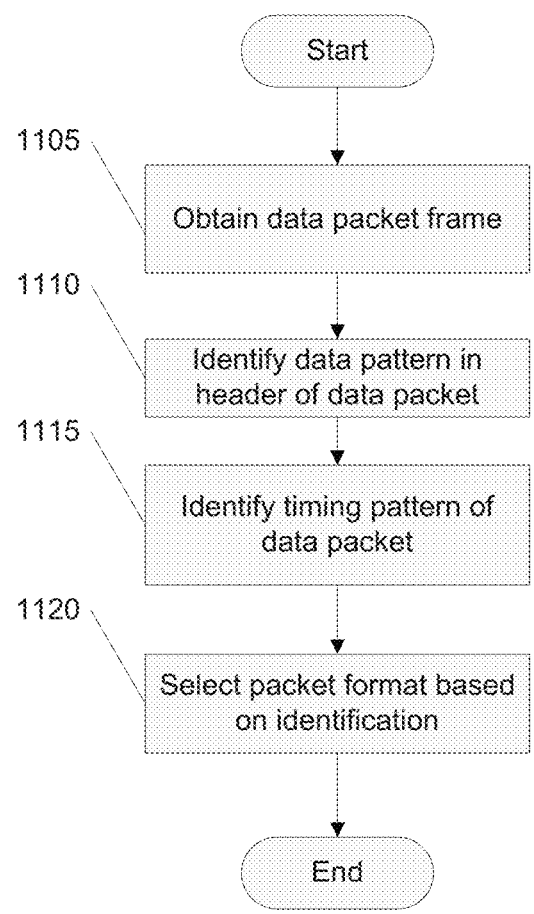
FIG. 11 illustrates a process for identifying a packet format of data transmitted on a vehicle bus based on identified patterns in headers of data packets in accordance with an embodiment of the invention.

Many embodiments identify a vehicle CAN bus protocol based on an analysis of the CAN bus signal to determine a packet format (e.g., 11-bit standard format, 29-bit extended format, among others) based on data patterns in a header of a packet frame of data being transmitted on the vehicle bus. A process for identifying a packet format of data transmitted on a vehicle bus based on identified patterns in headers of data packets in accordance with an embodiment of the invention is illustrated in FIG. 11. The process 1100 can obtain (1105) a data packet frame. The process may identify (1110) a data pattern in a header of the data packet. In many embodiments, the process can identify (1115) timing patterns of the data packets. The process selects (1120) a packet format based on the identified data and timing patterns. The process ends. Specific processes for identifying a vehicle CAN bus packet format based on data patterns and timing patterns in accordance with embodiments of the invention are described above and shown with respect to FIG. 11; however, any number of processes can be utilized as appropriate to the requirements of a specific application in accordance with embodiments of the invention.

Although the present invention has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present invention can be practiced otherwise than specifically described without departing from the scope and spirit of the present invention. Thus, embodiments of the present invention should be considered in all respects as illustrative and not restrictive. It will be evident to the person skilled in the art to freely combine several or all of the embodiments discussed here as deemed suitable for a specific application of the invention. Throughout this disclosure, terms like "advantageous", "exemplary" or "preferred" indicate elements or dimensions which are particularly suitable (but not essential) to the invention or an embodiment thereof, and may be modified wherever deemed suitable by the skilled person, except where expressly required. Accordingly, the scope of the invention should be determined not by the embodiments illustrated, but by the appended claims and their equivalents.

What is claimed is:

1. A vehicle telematics device in a vehicle, comprising:
a processor and a memory storing a vehicle telematics application; and
a communication interface for communicating with a remote server system and a plurality of vehicle modules on a vehicle Controller Area Network (CAN) bus of the vehicle;
wherein the processor of the vehicle telematics device, on reading the vehicle telematics application, is directed to:
enter a vehicle CAN bus protocol discovery mode;
sample a vehicle CAN bus signal;
perform bit timing analysis of the vehicle CAN bus signal, wherein to perform the bit timing analysis comprises to (i) monitor for a state transition of the vehicle CAN bus signal, (ii) measure, in response to a detection of the state transition, a pulse width of each valid high pulse and each valid low pulse occurring within a sample time after the detection of the state transition, and (iii) determine a bit timing of the vehicle CAN bus signal based on an observed minimum length of the high and low pulses occurring during the sample time, wherein each valid high and low pulse is defined as a pulse having a length falling within a window of valid bit pulse lengths for a BAUD rate of interest;
calculate a BAUD rate of the vehicle CAN bus signal based on the bit timing analysis;
determine a data packet format of data packets on the vehicle CAN bus; and
identify a vehicle CAN bus protocol from a plurality of vehicle CAN bus protocols based on the calculated BAUD rate and data packet format,
wherein the processor of the telematics device, on reading the vehicle telematics application, is further directed to set the vehicle CAN bus protocol to a default vehicle CAN bus protocol in response to a determination that the state transition has not been detected within a reference time period.

2. The vehicle telematics device of claim 1, wherein the processor of the telematics device, on reading the vehicle telematics application, is directed to:
measure a data packet length for a plurality of data packets; and
select the data packet format based on the measured data packet lengths.

3. The vehicle telematics device of claim 1, wherein the processor of the telematics device, on reading the vehicle telematics application, is directed to:
identify a data pattern in a header of a data packet; and
select the data packet format based on the identified data-pattern.

4. The vehicle telematics device of claim 1, wherein the processor of the telematics device, on reading the vehicle telematics application, is directed to:
identify a timing pattern of a data packet; and
select the data packet format based on the identified timing pattern.

5. The vehicle telematics device of claim 1, wherein the BAUD rate is at least one of the group consisting of 125 kbps, 250 kbps, 500 kbps, and 1 mbps, wherein the data packet format is at least one of the group consisting of an 11-bit standard data packet format and a 29-bit extended data packet format.

6. The vehicle telematics device of claim 1, wherein the plurality of vehicle CAN bus protocols comprises an ISO 15765-4 CAN (11 bit ID, 500 Kbaud), ISO 15765-4 CAN (29 bit ID, 500 Kbaud), ISO 15765-4 CAN (11 bit ID, 250 Kbaud), and ISO 15765-4 CAN (29 bit ID, 250 Kbaud).

7. The vehicle telematics device of claim 1, wherein determining the data packet format comprises sampling and measuring data packets on the vehicle CAN bus for a threshold time period; and
selecting the data packet format based on a statistical analysis of the sampled data packets.

8. A method for performing a vehicle Controller Area Network (CAN) bus protocol discovery for a telematics device, comprising:
entering a vehicle CAN bus protocol discovery mode;
sampling a vehicle CAN bus signal;
performing bit timing analysis of the vehicle CAN bus signal, wherein performing the bit timing analysis comprises (i) monitoring for a state transition of the vehicle CAN bus signal, (ii) measuring, in response to a detection of the state transition, a pulse width of each valid high pulse and each valid low pulse occurring within a sample time after the detection of the state transition, and (iii) determining a bit timing of the vehicle CAN bus signal based on an observed minimum length of the high and low pulses occurring during the sample time, wherein each valid high and low pulse is defined as a pulse having a length falling within a window of valid bit pulse lengths for a BAUD rate of interest;
calculating a BAUD rate of the vehicle CAN bus signal based on the bit timing analysis;
determining a data packet format of data packets on the vehicle CAN bus;
identifying a vehicle CAN bus protocol from a plurality of vehicle CAN bus protocols based on the calculated BAUD rate and data packet format; and
setting the vehicle CAN bus protocol to a default vehicle CAN bus protocol in response to a determination that the state transition has not been detected within a reference time period.

9. The method of claim 8, further comprising:
measuring a data packet length for a plurality of data packets; and
selecting the data packet format based on the measured data packet lengths.

10. The method of claim 9, further comprising:
measuring the data packet length based on a transition edge (1 to 0) of a dominant start-of-frame bit to a transition edge (0 to 1) at beginning of 11+ bit period of recessive (=1) state.

11. The method of claim 8, further comprising:
identifying a data pattern in a header of a data packet; and
selecting the data packet format based on the identified data pattern.

12. The method of claim 8, further comprising:
identifying a timing pattern of a data packet; and
selecting the data packet format based on the identified timing pattern.

13. The method of claim 8, wherein the BAUD rate is at least one of the group consisting of 125 kbps, 250 kbps, 500 kbps, and 1 mbps, wherein the data packet format is at least one of a group consisting of an 11-bit standard data packet format and a 29-bit extended data packet format.

14. The method of claim 8, wherein the plurality of vehicle CAN bus protocols comprises an ISO 15765-4 CAN (11 bit ID,500 Kbaud), ISO 15765-4 CAN (29 bit ID, 500 Kbaud), ISO 15765-4 CAN (11 bit ID, 250 Kbaud), and ISO 15765-4 CAN (29 bit ID, 250 Kbaud).

15. The method of claim 8, wherein determining the data packet format comprises sampling and measuring data packets on the vehicle CAN bus for a threshold time period; and
selecting the data packet format based on a statistical analysis of the sampled data packets.

16. A vehicle telematics device in a vehicle, comprising:
a processor and a memory storing a vehicle telematics application; and
a communication interface for communicating with a remote server system and a plurality of vehicle modules on a vehicle Controller Area Network (CAN) bus of the vehicle;
wherein the processor of the telematics device, on reading the vehicle telematics application, is directed to:
enter a vehicle CAN bus protocol discovery mode;
sample a vehicle CAN bus signal;
perform bit timing analysis of the vehicle CAN bus signal, wherein to perform the bit timing analysis comprises to (i) monitor for a state transition of the vehicle CAN bus signal, (ii) measure, in response to a detection of the state transition, a pulse width of each valid high pulse and each valid low pulse occurring within a sample time after the detection of the state transition, and (iii) determine a bit timing of the vehicle CAN bus signal based on an observed minimum length of the high and low pulses occurring during the sample time, wherein each valid high and low pulse is defined as a pulse having a length falling within a window of valid bit pulse lengths for a BAUD rate of interest;
calculate a BAUD rate of the vehicle CAN bus signal based on the bit timing analysis;
measure a data packet length for a plurality of data packets based on a transition edge (1 to 0) of a dominant start-of-frame bit to a transition edge (0 to 1) at beginning of 11+ bit period of recessive (=1) state;
select a data packet format based on the measured data packet lengths; and
identify a vehicle CAN bus protocol from a plurality of vehicle CAN bus protocols based on the calculated BAUD rate and data packet format.

17. The vehicle telematics device of claim 16, wherein the BAUD rate is at least one of the group consisting of 125 kbps, 250 kbps, 500 kbps, and 1 mbps, wherein the data packet format is at least one of a group consisting of an 11-bit standard data packet format and a 29-bit extended data packet format.

* * * * *